(12) United States Patent
Vogel (10) Patent No.: US 11,243,008 B2
(45) Date of Patent: Feb. 8, 2022

(54) DUCTWORK FRAME ASSEMBLY

(71) Applicant: Air Distribution Technologies IP, LLC, Milwaukee, WI (US)

(72) Inventor: Timothy A. Vogel, Grandview, MO (US)

(73) Assignee: Air Distribution Technologies IP, LLC, Milwaukee, WI (US)

( * ) Notice: Subject to any disclaimer, the term of this patent is extended or adjusted under 35 U.S.C. 154(b) by 509 days.

(21) Appl. No.: 16/133,489

(22) Filed: Sep. 17, 2018

(65) Prior Publication Data

US 2020/0064014 A1     Feb. 27, 2020

Related U.S. Application Data

(60) Provisional application No. 62/720,818, filed on Aug. 21, 2018.

(51) Int. Cl.
| | | |
|---|---|---|
| *B01D 46/00* | (2006.01) | |
| *B01D 46/10* | (2006.01) | |
| *F24F 13/08* | (2006.01) | |
| *F24F 13/10* | (2006.01) | |

(52) U.S. Cl.
CPC .......... *F24F 13/084* (2013.01); *F24F 13/085* (2013.01); *F24F 13/10* (2013.01); *B01D 46/0002* (2013.01); *B01D 46/0005* (2013.01); *B01D 46/0023* (2013.01); *B01D 46/10* (2013.01); *B01D 2265/04* (2013.01)

(58) Field of Classification Search
CPC ................ B01D 46/10; B01D 46/0002; B01D 46/0005; B01D 46/0023; B01D 2265/04; F24F 13/10; F24F 13/085; F24F 13/084

USPC .... 55/385.2, 355, 483, 511, 490.1; 454/186, 454/187, 271, 276, 277, 280, 330
See application file for complete search history.

(56) References Cited

U.S. PATENT DOCUMENTS

| | | | | |
|---|---|---|---|---|
| 3,217,631 A | * | 11/1965 | Thompson | E06B 7/082 454/309 |
| 3,442,744 A | * | 5/1969 | Rouse, Jr. | C08J 5/122 428/532 |
| 3,649,195 A | * | 3/1972 | Cook | C09C 1/50 423/450 |
| 3,782,050 A | * | 1/1974 | Dowdell | F24F 13/08 52/473 |
| 3,991,533 A | * | 11/1976 | Nagase | E06B 7/082 52/473 |
| 4,666,477 A | * | 5/1987 | Lough | B01D 46/10 137/625.3 |
| 5,255,486 A | * | 10/1993 | Wang | E06B 7/082 454/280 |
| 5,279,632 A | * | 1/1994 | Decker | B01D 46/0013 55/355 |

(Continued)

FOREIGN PATENT DOCUMENTS

EP          2617935       3/2014

*Primary Examiner* — Minh Chau T Pham
(74) *Attorney, Agent, or Firm* — Fletcher Yoder, P.C.

(57) ABSTRACT

A frame assembly for an air distribution system includes a damper assembly, a louver assembly, and a screen frame. Air flows through the damper assembly and the louver assembly, where the damper assembly terminates in a first flange and the louver terminates in a second flange. The first flange and the second flange are coupled to one another about a screen frame such that the screen frame is captured by abutting the first flange and the second flange.

20 Claims, 5 Drawing Sheets

(56) References Cited

U.S. PATENT DOCUMENTS

| | | | | |
|---|---|---|---|---|
| 6,604,994 | B2* | 8/2003 | Achen | F24F 13/084 454/271 |
| 6,746,324 | B2* | 6/2004 | Achen | F24F 13/082 454/276 |
| 7,740,530 | B2* | 6/2010 | Astourian | F24F 13/082 454/277 |
| 8,795,404 | B2* | 8/2014 | Lange | B01D 46/0005 55/511 |
| 8,979,963 | B2* | 3/2015 | Yang | E04B 9/064 55/483 |
| 9,441,853 | B2* | 9/2016 | Gorman | F24F 13/12 |
| 2006/0211362 | A1* | 9/2006 | Levy | F24F 13/06 454/186 |
| 2008/0173178 | A1* | 7/2008 | Metteer | B01D 53/75 95/286 |
| 2010/0207286 | A1* | 8/2010 | Jursich | F24F 6/043 261/102 |
| 2012/0137876 | A1* | 6/2012 | Miller | B01D 46/10 95/23 |
| 2014/0373493 | A1* | 12/2014 | Cannon | B01D 46/0005 55/490.1 |
| 2015/0118951 | A1* | 4/2015 | Beneke | F24F 13/10 454/330 |
| 2016/0341441 | A1* | 11/2016 | Murray | F24F 13/084 |
| 2020/0049370 | A1* | 2/2020 | Rockhold | F24F 13/1413 |

\* cited by examiner

DUCTWORK FRAME ASSEMBLY

CROSS REFERENCE TO RELATED APPLICATIONS

This application claims priority from and the benefit of U.S. Provisional Application Ser. No. 62/720,818, entitled "DUCTWORK FRAME ASSEMBLY," filed Aug. 21, 2018, which is hereby incorporated by reference in its entirety for all purposes.

BACKGROUND

The disclosure relates generally to heating, ventilation, and/or air conditioning (HVAC) systems, and specifically, to flowing air through ductwork of HVAC systems.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Environmental control systems are utilized in residential, commercial, and industrial environments to control environmental properties, such as temperature and humidity, for occupants of the respective environments. The environmental control system may control the environmental properties through control of an air flow delivered to and ventilated from the environment. For example, a heating, ventilating, and/or air conditioning (HVAC) system changes a temperature of the air flow and routes the air flow to spaces serviced by the HVAC system. The HVAC system may route the air flow through ductwork connected to the spaces. The ductwork may include components configured to direct the air flow and adjust a rate of the air flow directed through the ductwork. It is now recognized that such components may be bulky and difficult to assemble, which may affect a performance of the HVAC system and increase costs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a frame assembly for an air distribution system includes a damper assembly, a louver assembly, and a screen frame. Air flows through the damper assembly and the louver assembly, where the damper assembly terminates in a first flange and the louver terminates in a second flange. The first flange and the second flange are coupled to one another about a screen frame such that the screen frame is captured by abutting the first flange and the second flange.

In one embodiment, a screen frame for a frame assembly includes a clip portion configured to capture a distal end of a first flange of a damper frame or a louver frame, a gasket portion disposed opposite the clip portion and configured to abut a second flange of the other of the damper frame or the louver frame, and a leg extending from the clip portion and/or the gasket portion, where the leg is configured to abut a screen.

In one embodiment, a frame assembly for ductwork includes a damper with a damper blade coupled to a damper frame, a louver with a louver blade coupled to a louver frame, a screen frame disposed between the damper frame and the louver frame, and a screen disposed between the damper frame and the louver frame, wherein the screen is coupled to the screen frame. The screen frame is configured to capture a portion of the damper frame and the screen frame is configured to abut the louver frame.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to heating, ventilating, and/or air conditioning (HVAC) systems that use ductwork to direct air flow through different spaces to be serviced by the HVAC system. The ductwork may couple with a main unit, such as an air handling unit and/or a rooftop unit, configured to condition the air flow. The main unit may be coupled to several branches of ductwork that connect to the different spaces. The ductwork may be used to transport air flow to and/or from the spaces. That is, certain ductwork may transport conditioned air from the main unit to the spaces and other ductwork may extract air from the spaces to return to the main unit to be conditioned.

In some embodiments, the ductwork includes a component configured to adjust parameters of the air flow. For example, the ductwork includes louvers configured to direct the air flow in a certain direction. The ductwork may also include dampers configured to manage a rate of air flow through the ductwork. The louvers and/or dampers may be disposed in the ventilation system, such as at the main unit and/or within the ductwork. In certain embodiments, a louver and a damper are combined into a frame assembly configured to direct the air flow in a particular direction and at a certain rate. The frame assembly may also include a screen. As described herein, a screen may include a filter configured to trap and/or block particles, such as debris, from being directed through the frame assembly.

In accordance with certain embodiments of the present disclosure, a coupling of the louver, the damper, and the screen provides a compact frame assembly. Specifically, coupling the louver directly to one side of a frame of the screen and coupling the damper to the other side of the frame of the screen provides a compact frame assembly while maintaining a stability of the frame assembly. Since the louver, the screen, and the damper are directly coupled to one another, a length of the frame assembly may be limited, which creates cost efficiencies. Specifically, embodiments of this disclosure may provide cost efficiencies related to assembling the frame assembly. Additionally or alternatively, embodiments of this disclosure may increase an operational efficiency of the HVAC system by, for example, limiting pressure drop across the system. As used herein, a louver refers to a component configured to direct air flow in a particular direction via louver blades, where the louver blades are stationary relative to a supporting frame of the louver blades. Additionally, a damper refers to a component configured to adjust a rate of air flow via damper blades, where the damper blades are configured to move relative to a supporting frame of the damper blades.

Figure 1:
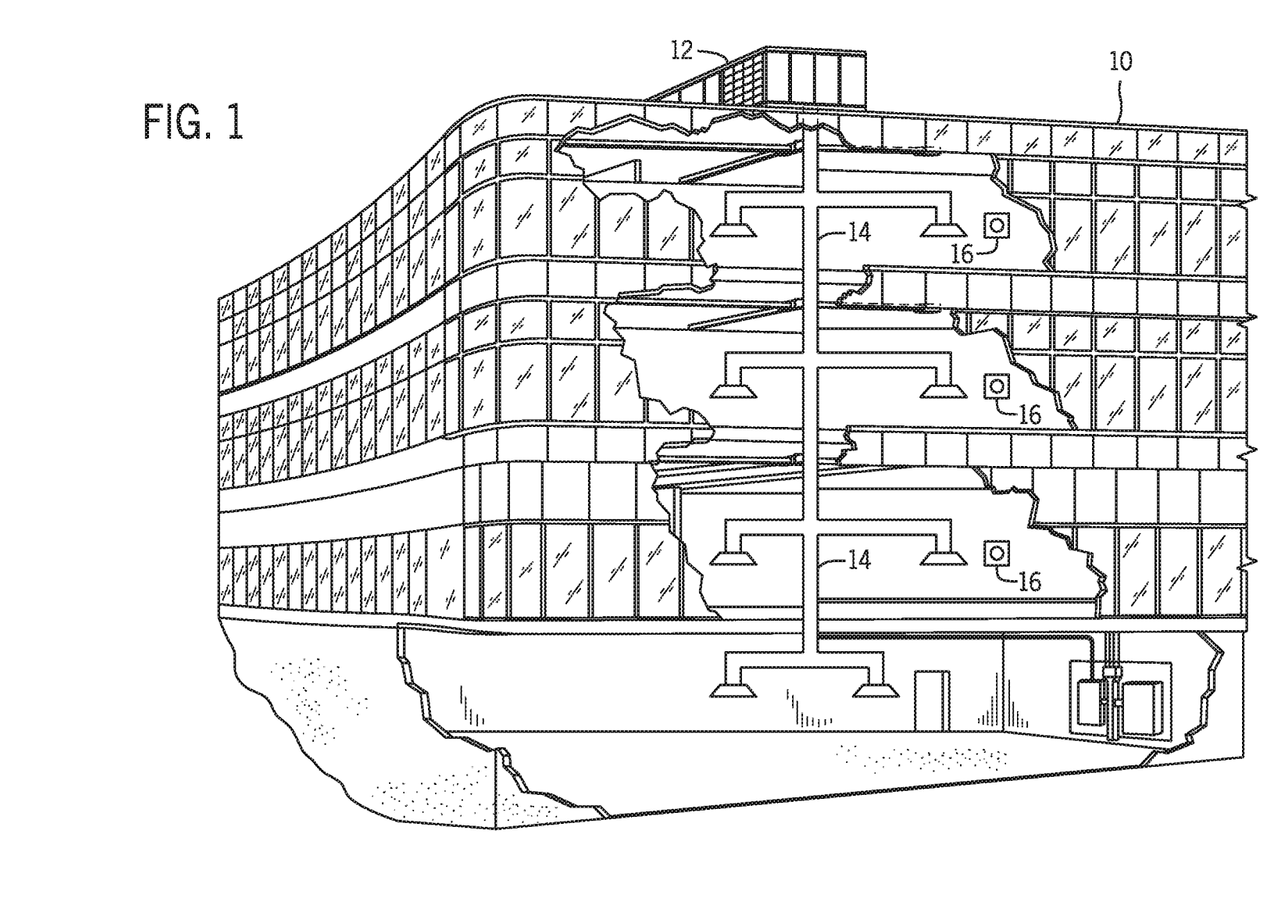
FIG. 1 is a schematic of an HVAC system for building environmental management that may employ one or more HVAC units, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, which includes an outdoor HVAC unit and an indoor HVAC unit.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

It should be appreciated that any of the features described herein may be incorporated with the HVAC unit 12, such as an air distribution system for the HVAC unit 12. Additionally, while the features disclosed herein are described in the context of embodiments that directly heat and cool a supply air stream provided to a building or other load, embodiments of the present disclosure may be applicable to other HVAC systems as well. For example, the features described herein may be applied to temperature management systems, such as mechanical cooling systems, free cooling systems, chiller systems, or other heat pump or refrigeration applications.

As noted above, an HVAC system may use ductwork to direct an air flow to spaces serviced by the HVAC system. The ductwork may include components configured to direct the air flow in a particular direction, such as louvers, and components configured to direct the air flow at a particular rate, such as dampers. The HVAC system may include a frame assembly that combines the louvers and dampers into a single assembly configured to perform functions of both components. The frame assembly may also include a screen, which may include one or more filters configured to block objects from flowing through the ductwork. In accordance with present embodiments, a louver, a damper, and a screen may be directly coupled to one another to decrease a size of the frame assembly and thus, to decrease a size of the HVAC system. The decreased size of the HVAC system may increase an efficiency of the HVAC system. For example, air may flow a shorter distance through the frame assembly, resulting in a reduced pressure drop, where the pressure loss would typically decrease a velocity of the air flow. Additionally, directly coupling each component to one another may reduce complexity of the frame assembly, such as by omitting certain components that may facilitate assembly of the frame assembly. As a result, a cost to produce the frame assembly may be limited. As discussed herein, the disclosure primarily describes the frame assembly as being disposed on a main unit of the HVAC system, such as to direct ambient air into the main unit where the ambient air may be conditioned. However, as should be understood, the frame assembly may also disposed elsewhere in the HVAC system, such as in other locations within ductwork of the HVAC system, in a space serviced by the HVAC system, and/or another location in the HVAC system where an air flow is directed through.

Figure 2:
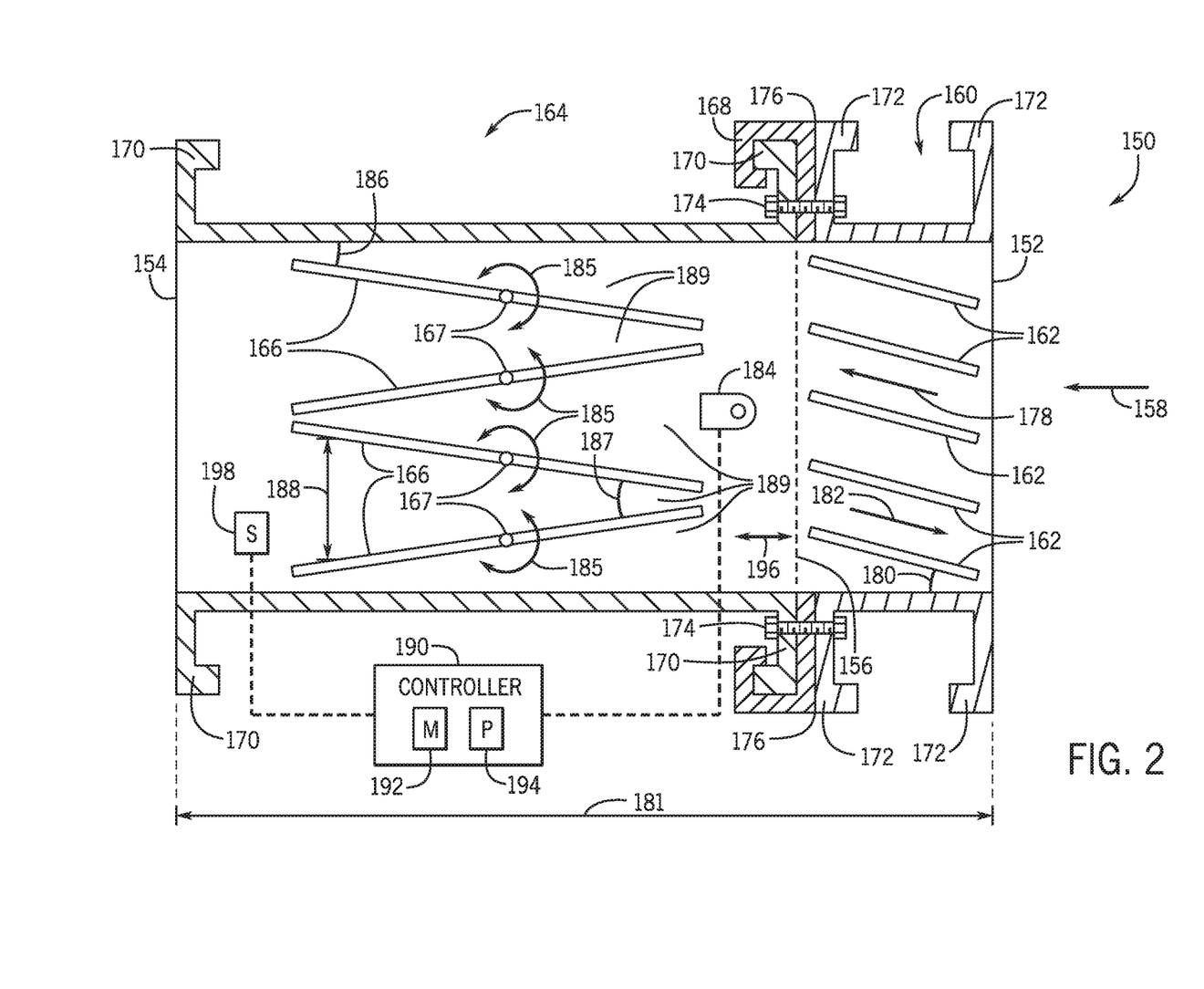
FIG. 2 is a cross-sectional side view of an embodiment of a frame assembly that includes a louver and a damper coupled to opposite sides of a screen frame, where the frame assembly may be used in an air distribution system for the HVAC system of FIG. 1, in accordance with an aspect the present disclosure.

To illustrate an embodiment of an assembled frame assembly, FIG. 2 is a cross-sectional side view of an embodiment of a frame assembly 150 that includes a louver 152, a damper 154, and a screen 156. As illustrated in FIG. 2, the screen 156 is disposed between the louver 152 and the damper 154. An air flow may be directed through the frame assembly 150 in a direction 158. In this manner, the screen 156 is disposed downstream of the louver 152 relative to the direction 158 and the damper 154 is disposed downstream of the screen 156 relative to the direction 158. However, in additional or alternative embodiments, the air flow, such as an exhaust air flow, may be directed through the frame assembly 150 in a direction opposite the direction 158. In this manner, the louver 152 is disposed downstream of the screen 156 and the screen 156 is disposed downstream of the damper 154 relative to the air flow direction. The louver 152 may include a louver frame 160 disposed on a portion of a border of the louver 152, where the louver frame 160 provides support for louver blades 162 disposed within the louver 152. Similarly, the damper 154 may include a damper frame 164 disposed on a portion of a border of the damper 154, where the damper frame 164 provides support for damper blades 166 coupled to respective hinges 167 disposed within the damper 154. The screen 156 may also include a screen frame 168 disposed on a portion of a border of the screen 156. As shown in FIG. 2, the damper frame 164 includes damper frame flanges 170, where the screen frame 168 may be similar in shape to the damper frame flanges 170 such that the screen frame 168 captures the damper frame flanges 170. Additionally, the louver frame 160 includes louver frame flanges 172 configured to abut the screen frame 168. Although FIG. 2 illustrates the screen frame 168 as capturing the damper frame flanges 170, in additional or alternative embodiments, the screen frame 168 may capture the louver frame flanges 172 and/or the screen frame 168 may abut the damper frame flanges 170.

As discussed herein, a flange, such as the damper frame flange 170 and/or the louver frame flange 172, includes any extension configured for engagement, such as by the screen frame 168. Although the illustrated embodiment in FIG. 2 depicts the damper frame flanges 170 and the louver frame flanges 172 as plate structures bent from the respective damper frame 164 and the louver frame 160, it should be understood that the damper frame flanges 170 and/or the louver frame flanges 172 may be of another embodiment configured to enhance engagement with the screen frame 168. In other words, the damper frame 164 may include another extension or mechanism to be captured by the screen frame 168 and/or the louver frame 160 may include another extension or mechanism to abut the screen frame 168. The damper frame flanges 170, the screen frame 168, and the louver frame flanges 172 may each include a hole such that a fastener 174 may be inserted through the hole. The fastener 174 may be configured to couple the damper frame flanges 170, the screen frames 168, and the louver frame flanges 172 with one another and thus couple the louver 152, the screen 156, and the damper 154 to one another. In some embodiments, a sealant, such as caulk, an adhesive, foam, or any combination thereof, may be disposed in a space 176 in between an adjacent one of the louver frame flanges 172 and the screen frames 168. The sealant may block air from flowing out from in between the louver frame 160 and the screen frame 168, which may limit the amount of unwanted air flow directed out of the frame assembly 150. Furthermore, the coupling of the damper frame flanges 170, the screen frames 168, and the louver frame flanges 172 may provide additional support for the louver 152, the screen 156, and the damper 154 to stabilize the frame assembly 150.

When the air flow is directed through the frame assembly 150, the louver blades 162 may change a direction of the air flow from the direction 158 to a direction 178. For example, the louver blades 162 may be at an angle 180 with respect to the direction 158 and with respect to a length 181 of the frame assembly 150 to change the air flow direction into the desired direction 178. Additionally, the louver blades 162 may block certain objects, such as debris and/or moisture, from entering a remainder of the frame assembly. That is, certain objects may be blocked by the louver blades 162 that are set in the angle 180. Instead of entering the frame assembly 150, the objects may accumulate on the louver blades 162 or transition away from the louver blades in a direction 182, such as due to gravity.

The air flow is directed through the screen 156 downstream of the louver 152. The screen 156 may further filter objects out of the air flow and block the objects from entering the damper 154. For example, the screen 156 includes openings that are sized to filter out objects that may be too large to fit through the openings. A size of the openings may change based on an application of the frame assembly. For example, a frame assembly 150 to be positioned outdoors may be sized to block insects, dirt, leaves, other debris, or any combination thereof from entering through to the damper 154. A frame assembly 150 to be positioned indoors may be sized to block dust particles from entering through to the damper 154. As should be appreciated, a screen 156 may include openings of different sizes at different sections of the screen 156.

Downstream of the screen 156, the air flow is directed through the damper blades 166 of the damper 154. In some embodiments, the damper blades 166 are configured to be adjustable to adjust a rate of air flow directed through the damper 154. As an example, an actuator 184 is coupled to the damper blades 166 and is configured to rotate each damper blade 166 about the respective hinges 167 in directions 185. Rotation of the respective damper blades 166 may adjust an angle 186 between the damper blade 166 and the damper frame 164 and/or an angle 187 between adjacent damper blades 166 to adjust a size 188 of each opening 189 between the damper blade 166 and the damper frame 164 and/or between adjacent damper blades 166. That is, if the rate of air flow is to be decreased, the damper blades 166 may be rotated to decrease the size 188 of each opening 189, whereas if the rate of air flow is to be increased, the position of the damper blades 166 may be rotated to increase the size of each opening 189.

The actuator 184 may be communicatively coupled to a controller 190 configured to activate the actuator 184. For example, the controller 190 includes a memory 192 and a processor 194. The memory 192 may be a mass storage device, a flash memory device, removable memory, or any other non-transitory computer-readable medium that contains instructions regarding controlling the damper blades 166. The memory 192 may also include volatile memory such as randomly accessible memory (RAM) and/or non-volatile memory such as hard disc memory, flash memory, and/or other suitable memory formats. The processor 194 may execute the instructions stored in the memory 192, such as to determine when to adjust the positions of the damper blades 166. The controller 190 may be communicatively coupled to sensors 198 that detect certain parameters of the air flow to determine if positions of the damper blades 166 should be adjusted. For example, the sensor 198 is configured to detect a volume, a speed, a temperature, another property, or any combination thereof, and the controller 190 may use the detected parameter to determine appropriate positions of the damper blades 166. It should be appreciated that, in some embodiments, the damper blades 166 may be offset from the screen 156 by a distance 196 such that, when the actuator 184 activates to move the damper blades 166, the damper blades 166 do not interfere and/or contact with the screen 156.

Subsequent to the damper 154, the air flow may be directed to a remainder of the HVAC system. For example, the frame assembly 150 is coupled to ductwork leading to a main unit and thus, the air flow is directed through the ductwork to the main unit to be conditioned. The frame assembly 150 may also be coupled directly to the main unit to direct the air flow immediately to the main unit.

Figures 3, 4:
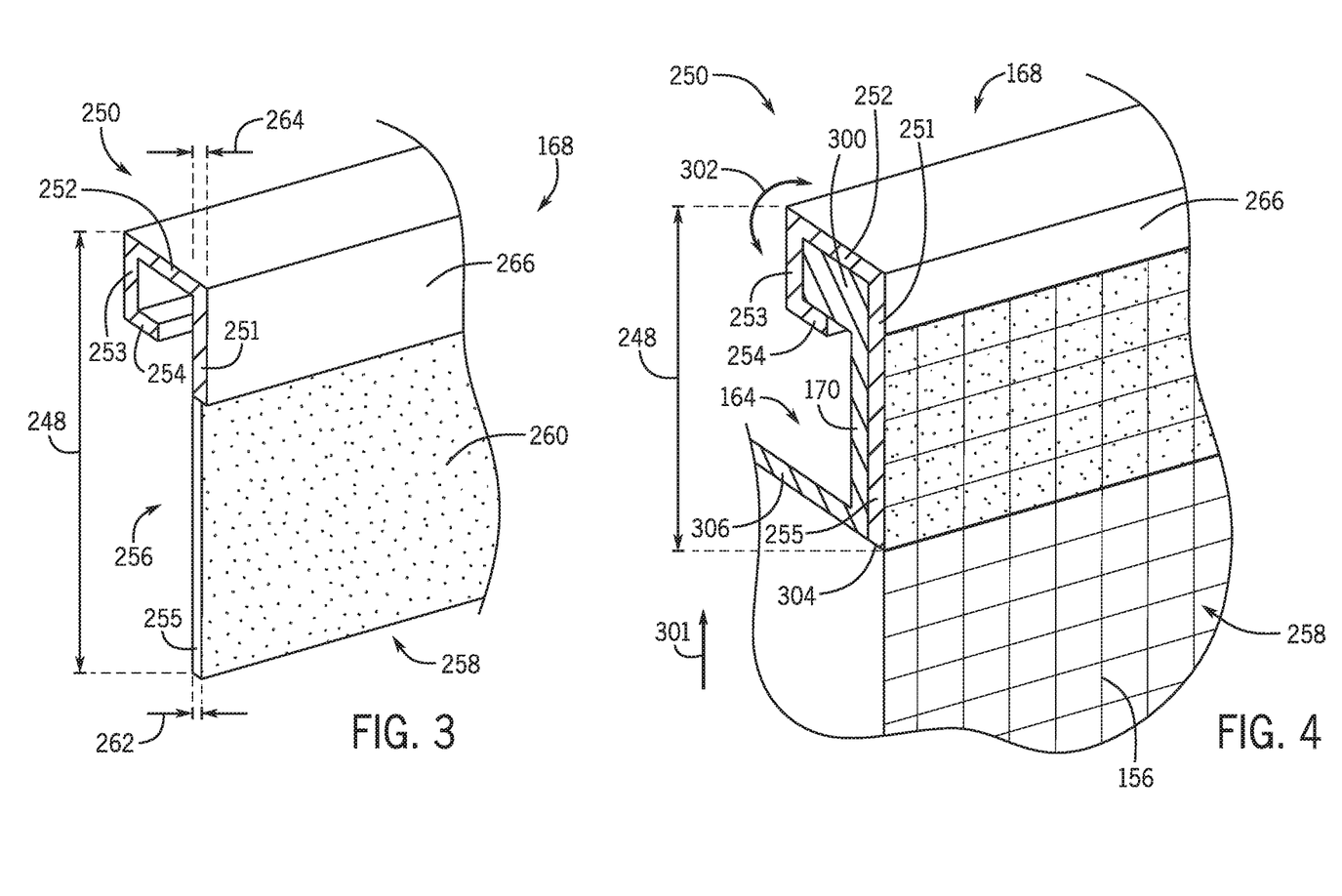
FIG. 3 is a perspective view of an embodiment of a screen frame configured to couple to a damper frame, where the screen frame includes an adhesive side, in accordance with an aspect the present disclosure.
FIG. 4 is a perspective view of an embodiment of a screen and a damper frame coupled to the screen frame of FIG. 3, in accordance with an aspect the present disclosure.

FIG. 3 is a perspective view of an embodiment of the screen frame 168. As previously mentioned, the screen frame 168 may be shaped to capture the damper frame flanges 170 of the damper frame 164 by, for example, slidably receiving the damper frame flange 170 along a length 248 of the screen frame 168. Specifically, the screen frame 168 may include a clip portion 250 configured to attach and capture to the damper frame 164. The clip portion 250 may be configured to be in contact with a distal end of the damper frame flange 170 and may include a first length 251 extending along the length 248, a second length 252 extending from the first length 251 transverse to the length 248, a third length 253 transversely extending from the second length 252, and a fourth length 254 transversely extending from the third length 253. The first length 251, the second length 252, the third length 253, and the fourth length 254 may capture the profile of the damper frame flange to secure the screen frame 168 to the damper frame flange 170. The screen frame 168 may also include a leg 255 configured to abut the damper 154 and/or the screen 156. That is, a first side 256 of the leg 255 may be configured to abut the damper 154 and a second side 258 of the leg 255 may be configured to abut the screen 156. To secure the screen 156 onto the screen frame 168, the second side 258 may include an adhesive 260 disposed thereon. It should be appreciated that additional components, such as a cover, a fastener, welds, or any combination thereof may also be used for securing the screen 156 onto the screen frame 168. The adhesive may cover an area of the leg 255 up to the clip portion 250. In some embodiments, a width 262 of the leg 255 is smaller than a width 264 of the clip portion 250 such that, when the screen 156 is attached to the second side 258 as shown in FIG. 4, the screen 156 is approximately level with a ledge 266 of the clip portion 250.

Although FIG. 3 primarily discusses that the screen frame 168 includes clip portion 250 to capture to the damper frame flange 170, it should be understood that the damper frame flange 170 may additionally or alternatively include the clip portion 250 to capture a distal end of the screen frame 168 and/or the louver frame flange 172. In other words, the damper frame flange 170 may be shaped to slidably receive the screen frame 168 along the length 248 to capture the profile of the screen frame 168 and/or the louver frame flange 172 to capture the screen frame 168 between the damper frame flange 170 and the louver frame flange 172. In additional or alternative embodiments, the louver frame flange may include the clip portion 250 to capture the profile of the screen frame 168 and/or the damper frame flange 170 to capture the screen frame 168 between the damper frame flange 170 and the louver frame flange 172.

FIG. 4 illustrates an embodiment of an assembly of the screen 156, the damper frame 164, and the screen frame 168 of FIG. 3. In the assembly, the clip portion 250 captures the damper frame flange 170 such that the first length 251, the second length 252, the third length 253, and the fourth length 254 captures a distal end 300 of the damper frame flange 170. For example, the damper frame flange 170 may slide in a direction 301 along the length 248. When the distal end 300 presses against the clip portion 250 with sufficient force, the clip portion 250 may yield in a direction 302 and permit the clip portion 250 to receive the distal end 300 and enable the first length 251, the second length 252, the third length 253, and the fourth length 254 to capture the profile of the distal end 300. As such, the distal end 300 is blocked from moving in the direction 301 and/or in a direction opposite the direction 302. Additionally, the screen 156 may be attached to the leg 255 of the screen frame 168 at the second side 258. With the screen 156 attached to the screen frame 168, the louver frame 160 may be positioned to abut the screen frame 168, such as at the ledge 266, and/or to abut the screen 156. The fastener 174 may be inserted through the damper frame 164, the screen frame 168, and the louver frame 160 to further couple the damper frame 164, the screen frame 168, and the louver frame 160 with one another. As such, the screen 156 may be further secured in between the screen frame 168 and the louver frame 160. Additionally, as shown in FIG. 4, a screen frame edge 304 is approximately level with a damper frame edge 306. In this manner, the screen frame 168 does not extend past the damper frame 164, where the screen frame 168 may interrupt with air flowing through the frame assembly 150. Sealant may be added in between the screen frame 168 and the louver frame 160 to block air flow. For example, the sealant may be added to the ledge 266 after coupling the damper frame 164, the screen frame 168, and the louver frame 160 with one another. In some embodiments, the sealant may also be used to adhere the screen 156 onto the leg 255.

Figure 5:
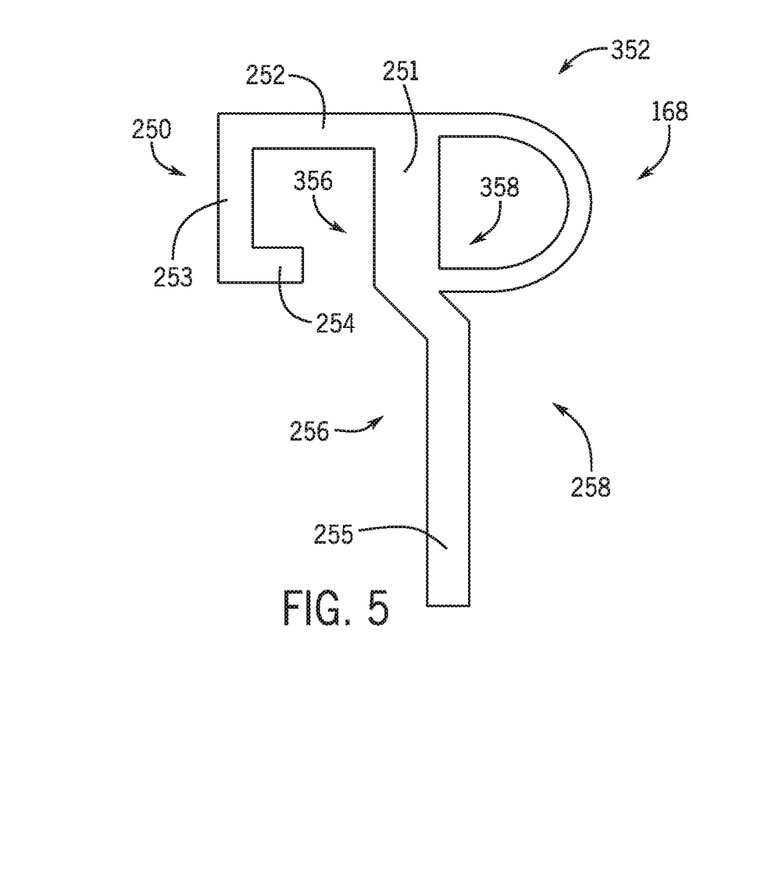
FIG. 5 is a side view of another embodiment of a screen frame configured to couple to a damper frame, where the screen frame includes a gasket portion, in accordance with an aspect the present disclosure.

Another embodiment of the screen frame 168 is illustrated in FIG. 5, which is a side view of the screen frame 168. This embodiment of the screen frame 168 includes the clip portion 250 configured to capture the damper frame 164 and a leg 255 configured to abut the damper 154 and/or the screen 156. The clip portion 250 of FIG. 5 may be shaped similarly to the clip portion 250 of FIGS. 3 and 4 to enable the first length 251, the second length 252, the third length 253, and the fourth length 254 to capture the damper frame flange 170. A gasket portion 352 may also extend from the first length 251 past the second side 258 of the leg 255 such that the gasket portion 352 abuts the louver frame flange 172 of the louver frame 160 when the screen frame 168 is coupled to the louver frame 160. As illustrated in FIG. 5, the gasket portion 352 may include an arcuate shape, but it should be understood that the gasket portion 352 may also include a different shape, such as a rectangular shape, a pointed shape, or any combination thereof to abut the louver frame flange 172. In this manner, a first side 356 of the first length 251 is a part of the clip portion 250 and a second side 358 of the first length 251 is a part of the gasket portion 352. The first length 251 and an extension therefrom may form the leg 255. In some embodiments, the leg 255 may be offset from the first length 251 towards the gasket portion 352. In this manner, the screen 156 may be positioned in between the first side 256 of the leg 255 and the damper frame flange 170 when the screen frame 168 is coupled to the damper 154.

Figure 6:
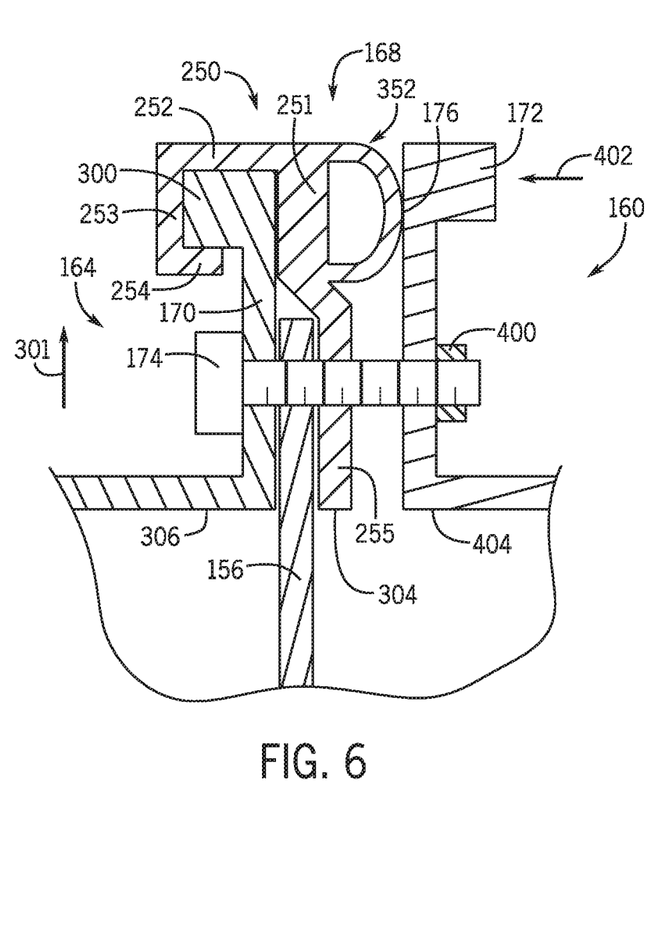
FIG. 6 is a cross-sectional side view of an embodiment of a damper frame, a screen, and a louver frame coupled to the screen frame of FIG. 5, in accordance with an aspect the present disclosure.

FIG. 6 is a cross-sectional side view of an embodiment of an assembly of the screen 156, the louver frame 160, the damper frame 164, and the screen frame 168 of FIG. 5. As illustrated in FIG. 6, the clip portion 250 is attached to the damper frame 164 such that the hook 252 captures the distal end 300 of the damper frame 170. Additionally, the gasket portion 352 abuts the louver frame flange 172 and the screen 156 is inserted between the leg 255 of the screen frame 168 and the damper frame flange 170. As mentioned, the fastener 174 may be inserted to couple the louver frame 160, the damper frame 164, and the screen frame 168 to one another. When inserted, the fastener 174 may extend past the louver frame flange 172 and a nut 400 may be inserted onto the fastener 174. The nut 400 may be used to tighten the fastener 174 to bias the damper frame flange 170 and the louver frame flange 172 towards one another. As such, the louver frame flange 172 imparts a force onto the gasket portion 352 in a direction 402 to compress the gasket portion 352. In this manner, the space 176 in between the screen frame 168 and the louver frame flange 172 may be reduced to block air from flowing through. As a result, an amount of sealant to be used in the space 176 may be reduced or eliminated, which may reduce a cost and/or time for assembling the frame assembly 150.

The screen frame 168 may include material such as polymer, rubber, composite, or any combination thereof to permit a certain amount of movement of the screen frame 168 in capturing the damper frame flange 170. In some embodiments, the screen frame 168 may include different materials. As an example, the screen frame 168 may include a dual durometer. As discussed herein, a dual durometer includes a combination, such as a fusion, of two materials of different properties. For embodiments of this disclosure, a dual durometer includes a combination of two materials of different hardnesses, where the clip portion 250 includes a first material and the gasket portion 352 includes a second material. Since the gasket portion 352 is configured to be compressed by the louver frame flange 172, the second material may be softer than the first material. As a result, the gasket portion 352 may permit some movement to absorb the force applied by the louver frame flange 172 and avoid placing excessive stress on the louver frame flange 172 and/or the screen frame 168. The first length 251 may enable the clip portion 250 and the gasket portion 352 to be coupled to one another. For example, the clip portion 250 and the gasket portion 352 may be molded, welded, and/or fused together to form the first length 251. It should be appreciated that the first length 251 may also be separate from the clip portion 250 and the gasket portion 352. That is, the clip portion 250 and the gasket portion 352 may separately couple to the first length 251. In some embodiments, the leg 255 also includes a same or a substantially similar material as that of the clip portion 250 and/or the gasket portion 352. For example, a portion of the leg 255 may include a harder material similar to the clip portion 250 to block excessive movement as a result of compression when the louver frame flange 172 is coupled against the screen frame 168. Additionally or alternatively, a portion of the leg 255 may include a softer material similar to the gasket portion 352 to permit additional movement during coupling, which may further secure the screen 156 in between the screen frame 168 and the damper frame flange 170.

As illustrated in FIG. 6, the leg 255 extends such that the screen frame edge 304 is approximately level with the damper frame edge 306. Additionally, a louver frame edge 404 may be approximately flush with the screen frame edge 304 and the damper frame edge 306 such that the flow of air is not interfered with by the louver frame 160, the damper frame 164, or the screen frame 168. In some embodiments, the leg 255 may be offset from the first length 251 towards the clip portion 250 or the leg 255 may not be offset from the first length 251. Thus, the screen 156 may be positioned in between the leg 255 and the louver frame flange 172. As such, when louver frame flange 172 is coupled to the screen frame 168, the louver frame flange 172 may abut against both the gasket portion 352 and the leg 255 to compress and secure the screen 156 in place.

In certain embodiments, additional components may be used to further secure the components together. By way of example, adhesives may be placed on the leg 255 to further secure the screen frame 168 with the screen 156 and/or the louver frame flange 172. The adhesives may also be placed on the clip portion 250 to secure the clip portion 250 with the damper frame flange 170 and/or to secure the gasket portion 352 to the louver frame flange 172. Other components may also be used in addition to or in place of the adhesives to further secure the screen 156, louver frame 160, the damper frame 164, and the screen frame 168 of FIGS. 5 and 6 to one another. It should also be appreciated that the aforementioned methods may be implemented to secure the embodiments of the screen 156, louver frame 160, the damper frame 164, and the screen frame 168 of FIGS. 3 and 4 with one another.

Figure 7:
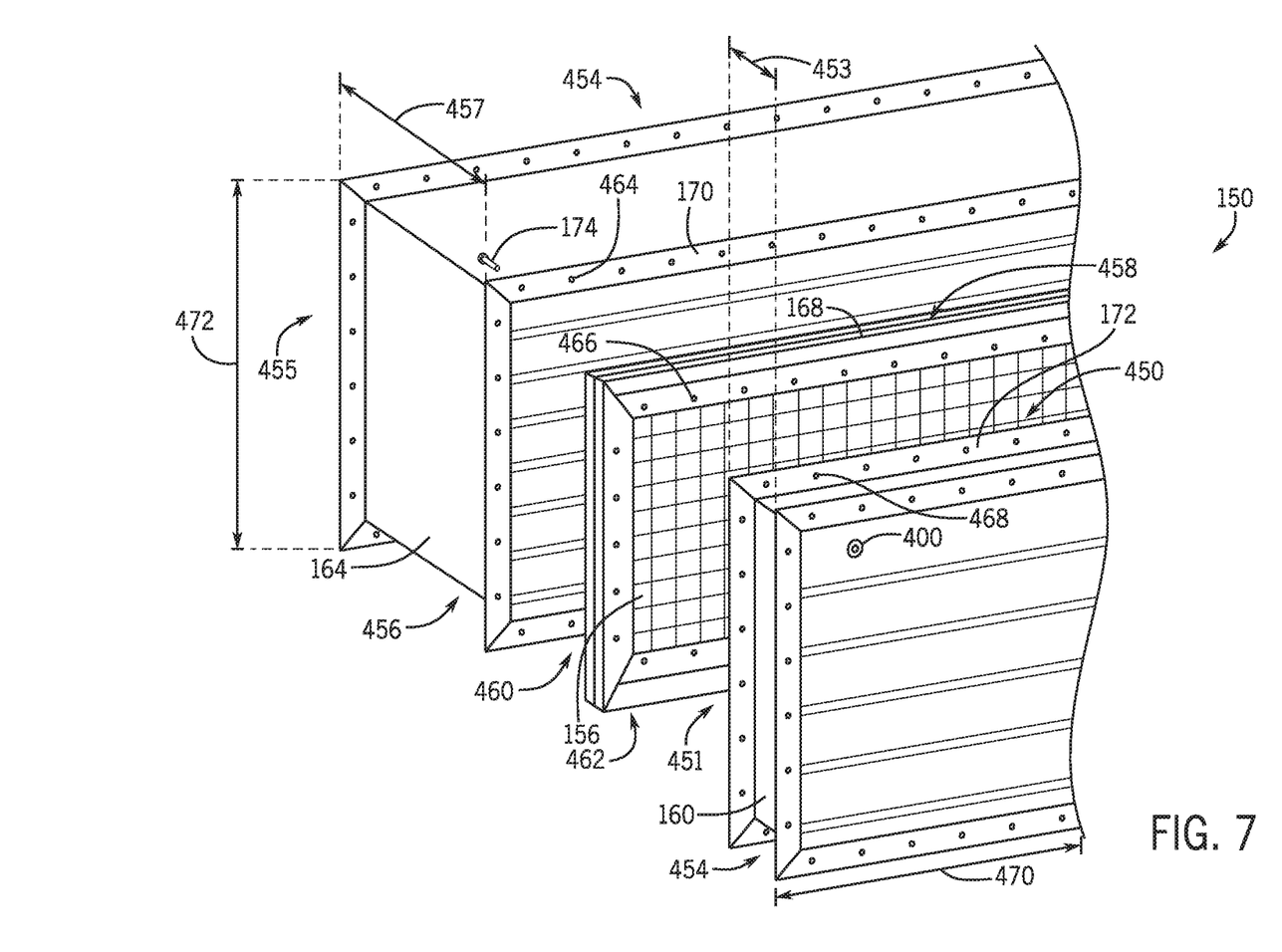
FIG. 7 is an exploded perspective view of the frame assembly of FIG. 2, in accordance with an aspect the present disclosure.

FIG. 7 is an exploded perspective view of the frame assembly 150, which may be the same or a substantially similar frame assembly 150 as the frame assembly 150 of FIG. 2, and includes the louver frame 160, the screen frame 168, the screen 156, and the damper frame 164. As shown in FIG. 7, a pair of louver frame flanges 172 are disposed at a first side 450 of the louver frame 160, a second side 451 of the louver frame 160, and a third side 452 of the louver frame 160. The louver frame flanges 172 of each pair of louver frame flanges 172 may be disposed at opposite ends of a length 453 of the louver frame 160. The damper frame 164 may similarly include a pair of damper frame flanges 170 disposed at a first side 454 of the damper frame 164, a second side 455 of the damper frame 164, and a third side 456 of the damper frame 164. The damper frame flanges 170 of each pair of damper frame flanges may be disposed at opposite ends of a length 457 of the damper frame 164. Additionally, the screen 156 may include a screen frame 168 disposed on a first side 458 of the screen 156, a second side 460 of the screen 156, and a third side 462 of the screen 156 to align with corresponding damper frame flanges 170 and louver frame flanges 172.

As should be understood, the screen frame 168 may attach to particular damper frame flanges 170 and louver frame flanges 172. For example, in the alignment illustrated in FIG. 7, the screen frame 168 of the first side 458 of the screen 156 is configured to attach to the damper frame flange 170 of the first side 454 of the damper frame 164 and the louver frame flange 172 of the first side 450 of the louver frame 160. As should be appreciated, in certain embodiments, the damper frame 164 and/or the louver frame 160 may be aligned to enable holes 464 of the damper frame 164 to align with holes 466 of the screen frame 168 and holes 468 of the louver frame 160. As such, the fastener 174 may be inserted through the aligned holes 464, 466, and 468 and tightened via the nut 400 to couple the damper frame 164, the screen frame 168, and the louver frame 160 to one another. The holes 464, 466, and 468 may be disposed on the respective damper frame flanges 170, screen frame 168, and louver frame flanges 172 to enable the louver frame 160, the screen frame 168, and the damper frame 164 to be coupled to one another, such as in rows where each hole is spaced 10 centimeters to 30 centimeters away from one another.

To attach the frame assembly 150 to the rest of the HVAC system, certain damper frame flanges 170 and/or louver frame flanges 172 may be coupled to other components of the HVAC system, such as a main unit and/or ductwork of the HVAC system. In further embodiments, the louver frame 160 and/or the damper frame 164 may be coupled to additional components of another frame assembly 150. For example, the damper frame 164 may be coupled to another damper frame 164 and/or another louver frame 160. In this manner, multiple dampers 154 and multiple louvers 152 may be used to further control air flow through the frame assembly 150.

In certain embodiments, the louver frame 160, the screen frame 168, the screen 156, and the damper frame 164 may each extend a length 470. For example, the length 470 may be 50 centimeters to 150 centimeters and may depend on an application of the frame assembly 150, such as a desired volume of air flow through the frame assembly 150. Additionally, the louver frame 160, the screen frame 168, the screen 156, and the damper frame 164 may each extend a height 472, such as 30 centimeters to 100 centimeters. In some embodiments, the louver frame 160, the screen frame 468, the screen 156, and/or the damper frame 164 may include different heights 472 and/or different lengths 470. For example, the length 470 of the louver frame 160 may be shorter than the length 470 of the louver frame 160, the screen frame 468, and the screen 156. Moreover, the damper frame 164, the screen 156, and/or the louver frame 160 may not include the respective damper frame flanges 170, the screen frames 168, and the louver frame flanges 172 at certain sides. That is, for instance, the damper frame 164 may include damper frame flanges 170 disposed on the first side 454 and the second side 456 of the damper frame 164, but not on the second side 455 of the damper frame 164. In additional or alternative embodiments, the screen frame 168 may be configured differently around a border of the screen 156. For example, each of the screen frames 168 disposed on the first side 450 and the third side 454 may be of the embodiment of the screen frame 168 illustrated in FIGS. 3 and 4, whereas the screen frame 168 that is disposed on the second side 452 may be of the embodiment of the screen frame 168 illustrated in FIGS. 5 and 6.

Although FIGS. 2-7 illustrate the louver frame 160, the screen frame 168, the screen 156, and the damper frame 164 as generally rectangular in shape, it should be understood that the shape of the louver frame 160, the screen frame 168, the screen 156, and the damper frame 164 may be of any other suitable shape. Additionally, the shape of the louver frame 160, the screen frame 168, the screen 156, and the frame 164 may be different from one another. In particular embodiments, the louver frame 160, the screen frame 168 and the damper frame 164 may be assembled in a different order. That is, while FIGS. 2, 6, and 7 depict the screen frame 168 as downstream of the louver frame 160 relative to the air flow and the damper frame 164 as downstream of the screen frame 168 relative to the air flow, the arrangement of the louver frame 160, the screen frame 168, the screen 156, and the damper frame 164 relative to the direction of air flow may be different in certain embodiments.

Embodiments of the present disclosure may provide one or more technical effects useful in the operation of air distribution systems, which may be associated with an HVAC system. For example, a damper, a louver, and a screen may be coupled together in a single frame assembly. Specifically, the louver includes a louver frame coupled to a first side of a screen frame and the damper includes a damper frame coupled to second side of the screen frame opposite the first side. Additionally, a screen may be attached to the screen frame, such as between the screen frame and the damper frame or the louver frame. By directly coupling the damper frame, the louver frame, and the screen frame to one another, a distance between the damper, the louver, and the screen is decreased, which results in a limited size of the frame assembly and the HVAC system. The limited size of the frame assembly and the HVAC system may increase efficiency of the HVAC system because air may travel a shorter distance through the frame assembly. Additionally, directly coupling the damper frame, the louver frame, and the screen frame may reduce a quantity of components in the frame assembly, resulting in a lower complexity to assemble the frame assembly. As such, costs to manufacture the frame assembly may be limited. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, mounting arrangements, use of materials, colors, orientations, and the like, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosed embodiments, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A frame assembly for an air distribution system, comprising:
   a damper assembly through which air flows and which terminates in a first flange; and
   a louver assembly through which air flows and which terminates in a second flange, wherein the first flange and the second flange are coupled to one another about a screen frame such that the screen frame is captured by abutting the first flange and the second flange.

2. The frame assembly of claim 1, wherein the screen frame comprises a clip portion configured to capture a distal end of the first flange and wherein the screen frame comprises a gasket portion configured to abut against the second flange.

3. The frame assembly of claim 2, wherein the screen frame comprises a dual durometer.

4. The frame assembly of claim 3, wherein the gasket portion comprises a first material of the dual durometer, and the clip portion comprises a second material of the dual durometer.

5. The frame assembly of claim 4, wherein the second material is softer than the first material.

6. The frame assembly of claim 2, wherein the clip portion comprises a first length, a second length extending transversely from the first length, a third length extending transversely from the second length, and a fourth length extending transversely from the third length, and wherein the first length, the second length, the third length, and the fourth length capture a profile of the distal end of the first flange.

7. The frame assembly of claim 1, wherein the first flange comprises a clip portion configured to capture a distal end of the screen frame.

8. The frame assembly of claim 1, wherein the second flange comprises a clip portion configured to capture a distal end of the screen frame.

9. The frame assembly of claim 1, further comprising caulk, adhesive, foam, or any combination thereof applied between the screen frame and the second flange.

10. The frame assembly of claim 1, wherein the screen frame comprises a leg configured to capture a screen between the screen frame and the second flange.

11. The frame assembly of claim 10, wherein the screen frame comprises an adhesive layer disposed thereon coupling the screen to the screen frame.

12. The frame assembly of claim 1, comprising a fastener extending through the first flange, the second flange, and the screen frame, wherein the fastener imparts a compressive force to couple the first flange and the second flange to one another and capture the screen frame.

13. A frame assembly for ductwork, comprising:
   a damper comprising a damper blade coupled to a damper frame;
   a louver comprising a louver blade coupled to a louver frame;
   a screen frame disposed between the damper frame and the louver frame, wherein the screen frame is configured to capture a portion of the damper frame, and wherein the screen frame is configured to abut the louver frame; and
   a screen disposed between the damper frame and the louver frame, wherein the screen is coupled to the screen frame.

14. The frame assembly of claim 13, wherein the screen frame comprises a clip portion configured to capture a distal end of a flange of the damper frame.

15. The frame assembly of claim 13, wherein the screen frame comprises a gasket portion configured to abut against a flange of the louver frame.

16. The frame assembly of claim 13, wherein the screen frame comprises a leg configured to abut the screen against the louver frame.

17. The frame assembly of claim 13, further comprising a fastener configured to couple the damper frame, the louver frame, the screen frame, and the screen to one another.

18. The frame assembly of claim 13, wherein the damper frame comprises a first damper frame flange and a second damper frame flange, wherein the louver frame comprises a first louver frame flange and a second louver frame flange, wherein the screen frame is a first screen frame configured to capture the first damper frame flange and to abut the first louver frame flange, and wherein the frame assembly comprises a second screen frame configured to capture the second damper frame flange and to abut the second louver frame flange.

19. The frame assembly of claim 13, wherein the frame assembly is configured to receive an air flow, wherein the damper is disposed downstream of the screen relative to a direction of the air flow, and wherein the screen is disposed downstream of the louver relative to the direction of the air flow.

20. The frame assembly of claim 13, wherein a position of the damper blade is adjustable within the damper.

* * * * *